US011895751B2

(12) United States Patent
He et al.

(10) Patent No.: US 11,895,751 B2
(45) Date of Patent: Feb. 6, 2024

(54) LEAKAGE PROTECTION CIRCUIT AND DIMMING DRIVE CIRCUIT

(71) Applicant: Joulwatt Technology Co., Ltd., Hangzhou (CN)

(72) Inventors: Wanyue He, Hangzhou (CN); Guoqiang Liu, Hangzhou (CN)

(73) Assignee: JOULWATT TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/950,938

(22) Filed: Sep. 22, 2022

(65) Prior Publication Data

US 2023/0090441 A1 Mar. 23, 2023

(30) Foreign Application Priority Data

Sep. 22, 2021 (CN) .......................... 202111104864.4

(51) Int. Cl.

*H05B 45/50* (2022.01)
*H05B 45/10* (2020.01)
*H05B 45/32* (2020.01)

(52) U.S. Cl.

CPC ............. *H05B 45/50* (2020.01); *H05B 45/10* (2020.01); *H05B 45/32* (2020.01)

(58) Field of Classification Search

CPC ........ H05B 45/50; H05B 45/10; H05B 45/32; H05B 47/26; H05B 45/31; H05B 45/315

See application file for complete search history.

(56) References Cited

U.S. PATENT DOCUMENTS

2018/0241195 A1* 8/2018 Zhang ...................... H05B 6/00
2018/0295685 A1* 10/2018 Wang ................... H05B 45/395
2018/0310376 A1* 10/2018 Huang ................... H05B 45/10

* cited by examiner

*Primary Examiner* — Minh D A

(74) *Attorney, Agent, or Firm* — Bayramoglu Law Offices LLC

(57) ABSTRACT

A leakage protection circuit and a dimming drive circuit are provided. A leakage detection circuit is configured to detect whether leakage occurs between two input terminals that receive an external signal. When leakage occurs, leakage protection measures are taken. A pulse generation circuit receives the sampling signal characterizing the voltage between the two input terminals to compare the sampling signal with two thresholds to control a detection path of the leakage detection circuit to be turned on or off according to a comparison result. The leakage detection path is enabled to be turned on twice by setting two pulse signals in a power frequency period, which can consider the leakage detection of the front-edge phase-cutting dimming and rear-edge phase-cutting dimming of the dimming drive circuit and has a wide range of applications.

18 Claims, 4 Drawing Sheets

LEAKAGE PROTECTION CIRCUIT AND DIMMING DRIVE CIRCUIT

CROSS REFERENCE TO THE RELATED APPLICATIONS

This application is based upon and claims priority to Chinese Patent Application No. 202111104864.4, filed on Sep. 22, 2021, the entire contents of which are incorporated herein by reference.

TECHNICAL FIELD

The present invention relates to the technical field of power electronics, particularly to a leakage protection circuit and a dimming drive circuit.

BACKGROUND

In electrical lighting occasions, an electric load may be connected at one part while the other part thereof is exposed during an installation process. If a person accidentally touches the exposed part at this time, they may receive an electric shock, which is contrary to the safe operation, and thus needs leakage detection and protection measures.

In the prior art, it is generally common to detect the signal of the input terminal periodically to determine whether leakage occurs before taking leakage protection measures, but in the dimming drive circuit with a phase-cutting dimmer, the alternating current (AC) input signal is processed by performing the phase-cutting angle of the phase-cutting dimmer. However, the prior leakage protection circuit can only correspond to one type of phase-cutting angle. For example, the triac dimming drive circuit can detect the front-edge phase-cutting angle. However, the phase-cutting angle of a phase-cutting dimmer may be the front-edge phase-cutting dimming or the rear-edge phase-cutting dimming, so the application of the leakage detection solution in the prior art is limited.

SUMMARY

Based on the above problems, the present invention provides a leakage protection circuit and a dimming drive circuit to solve the technical problem that an electric shock may easily occur in the process of replacing a double-ended lamp in the prior art.

In the technical solutions of the present invention, a leakage protection circuit includes two input terminals for receiving an external signal. The leakage protection circuit includes a leakage detection circuit and a control circuit. The leakage detection circuit is connected between the two input terminals and detects whether a leakage phenomenon exists between the two input terminals when a detection path of the leakage detection circuit is turned on. The control circuit receives a sampling signal characterizing a voltage between the two input terminals, is configured to compare the sampling signal with a first threshold and a second threshold within a power frequency period, and controls whether the detection path is turned on according to a comparison result. When the leakage phenomenon is detected between the two input terminals, the control circuit controls a load to be in a non-working state.

Preferably, the control circuit includes a pulse generation circuit. The pulse generation circuit is configured to obtain a first comparison signal according to the comparison between the sampling signal and the first threshold and obtain a second comparison signal according to the comparison between the sampling signal and the second threshold. A first pulse signal is obtained according to the first comparison signal, and a second pulse signal is obtained according to the second comparison signal. The first pulse signal and the second pulse signal are configured to control whether the detection path is turned on or off.

Preferably, when the first comparison signal jumps to a high-level effective state, the first pulse signal is generated. When the second comparison signal jumps to a high-level effective state, the second pulse signal is generated.

Preferably, the detection path is turned on within an effective pulse width time of the first pulse signal or an effective pulse width time of the second pulse signal.

Preferably, the value of the first threshold and the value of the second threshold are unequal.

Preferably, the detection path includes a switch, and the first pulse signal and the second pulse signal control an on-off of the switch to control whether the detection path of the leakage detection circuit is turned on or off.

Preferably, the detection path further includes a detection resistor. The detection resistor and the switch are connected in series between the two input terminals. The detection resistor is sampled to obtain a current detection signal. The leakage detection circuit is configured to determine whether the leakage phenomenon exists between the two input terminals according to the comparison result between the current detection signal and a reference value.

Preferably, when detection is started, the current detection signal is compared with the reference value. When the current detection signal reaches the reference value, a valid comparison result is recorded, and cumulative counting is made. When the current detection signal does not reach the reference value, an invalid comparison result is recorded. A discrimination number M is set. If the counting times of the valid comparison result reach M, no leakage phenomenon exists between the two input terminals. If the counting times of the valid comparison result do not reach M, the leakage phenomenon exists between the two input terminals. During the detection, if the invalid comparison result occurs, a cumulative counting result is cleared to zero.

Preferably, the pulse generation circuit includes a first comparator, a second comparator, and a pulse circuit. The first comparator includes a positive input terminal receiving the sampling signal, a negative input terminal receiving the first threshold, and an output terminal outputting the first comparison signal. The second comparator includes a positive input terminal receiving the second threshold, a negative input terminal receiving the sampling signal, and an output terminal outputting the second comparison signal. The pulse circuit receives the first comparison signal and the second comparison signal to output the first pulse signal and the second pulse signal.

Preferably, the control circuit includes a driver and a logic circuit. The first pulse signal and the second pulse signal are transmitted to the driver, and the driver controls the switch to be turned on intermittently according to the first pulse signal and the second pulse signal. A detection result generated by the leakage detection circuit and characterizing whether a leakage exists between the two input terminals is transmitted to the logic circuit. The logic circuit outputs a first logic signal according to the detection result, and the first logic signal is converted into a drive signal through the driver to control the on-off state of the switch.

Preferably, when the detection result output by the leakage detection circuit characterizes that a leakage exists, the logic circuit generates the first logic signal to allow the switch to continue to be intermittently turned on to continue the detection. Alternatively, when the detection result output by the detection circuit characterizes that a leakage exists, the logic circuit generates the first logic signal to allow the switch to be turned off to wait for the next period to restart the detection. When the detection result outputted by the detection circuit characterizes that no leakage exists, the first logic signal generated by the logic circuit allows the switch to be turned off to stop the detection of the leakage.

The present invention includes a dimming drive circuit configured for driving a lighting load. The dimming drive circuit includes a phase-cutting dimmer, a rectifier circuit, the aforementioned leakage protection circuit, and a drive circuit. An external AC input signal is processed by the phase-cutting dimmer and then transmitted to the rectifier circuit, and the rectifier circuit outputs a rectified signal. The two input terminals of the leakage protection circuit receive an output signal of the phase-cutting dimmer or the rectified signal. The drive circuit drives the lighting load according to the rectified signal and the detection result of the leakage protection circuit.

Preferably, when the detection result of the leakage protection circuit characterizes that a leakage exists, the drive circuit is controlled to not work or not be enabled. When the detection result of the leakage protection circuit characterizes that no leakage exists, the drive circuit is controlled to drive normally to supply power to the lighting load.

Compared with the prior art, the technical solutions of the present invention have the following advantages. Two input terminals receive an external signal, and the leakage detection path is connected between the two input terminals. The pulse generation circuit receives the sampling signal characterizing the voltage between the two input terminals to compare the sampling signal with the first threshold and the second threshold to obtain the first pulse signal and the second pulse signal. The first pulse signal and the second pulse signal are configured to control whether the leakage detection path is turned on or off. The leakage detection circuit is configured to detect whether the leakage exists between the two input terminals that receive the external signal. When leakage occurs, leakage protection measures are taken. In the technical solutions of the present invention, the leakage detection path is enabled to be turned on twice by setting two pulse signals in a half-wave period, which can account for the leakage detection of the front-edge phase-cutting dimming and rear-edge phase-cutting dimming of the phase-cutting dimming drive circuit and has a wide range of application.

DETAILED DESCRIPTION OF THE EMBODIMENTS

As follows, the preferred embodiments of the present invention are described in detail in conjunction with the drawings, but the present invention is not limited to these embodiments. The present invention covers any substitution, modification, equivalent method, and solution made based on the ideas and scope of the present invention.

To enable the present invention to be thoroughly understood, the specific details are described in detail in the following preferred embodiments of the present invention, and the present invention can be fully understood without a description of these details for those skilled in the art.

The present invention is described specifically using examples in the following paragraphs with reference to the drawings. It should be noted that the drawings are all in a simplified form and use imprecise proportions, which are only used to assist in illustrating the embodiments of the present invention conveniently and clearly.

Figure 1:
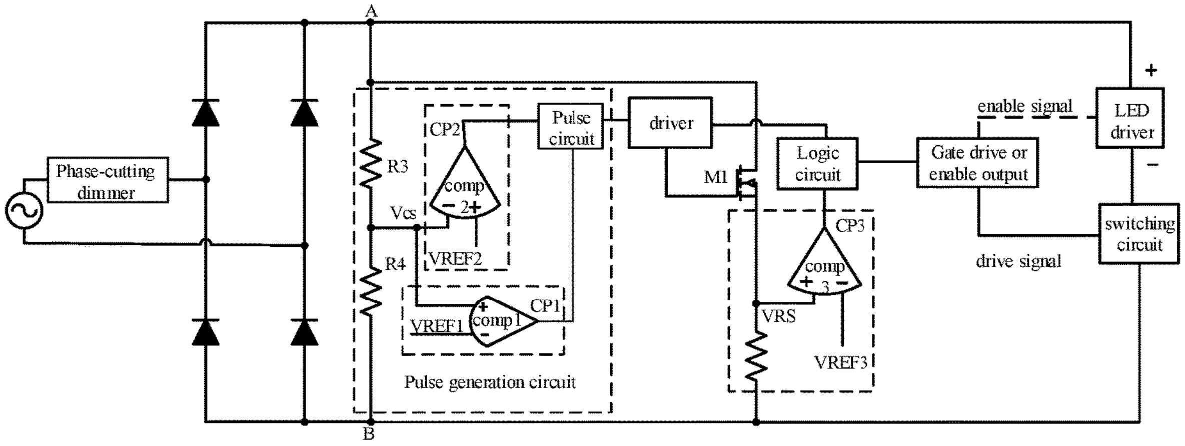
FIG. 1 is a circuit diagram of a dimming drive circuit according to the first embodiment of the present invention.

FIG. 1 shows a circuit diagram of the dimming drive circuit of the present invention. The dimming drive circuit includes a phase-cutting dimmer, a rectifier circuit (such as the full-bridge rectifier circuit in FIG. 1), a leakage protection circuit, and a drive circuit. The external alternating current (AC) input signal such as the AC signal is processed by the phase-cutting dimmer and then transmitted to the rectifier circuit, and the rectifier circuit outputs a rectified signal. Two input terminals of the leakage protection circuit (such as terminal A and terminal B in FIG. 1) receive an output signal of the phase-cutting dimmer or the rectified signal. In the present embodiment, taking the received rectified signal as an example, the rectified signal is a half-wave periodic signal, and a half-wave period herein is a power frequency period. When the received signal is a full-wave signal, a full-wave period is a power frequency period. The present invention does not limit the type of the phase-cutting dimmer, for example, it can be a triac dimmer capable of realizing front-edge phase-cutting dimming, or it can be a switch tube phase-cutting dimmer capable of realizing rear-edge phase-cutting dimming, and the drive circuit herein is a light-emitting diode (LED) driver.

As an example, the leakage protection circuit includes a leakage detection circuit and a control circuit. The leakage detection circuit is connected between the two input terminals, and it is detected whether the leakage phenomenon exists between the two input terminals when the detection path of the leakage detection circuit is turned on. The control circuit includes a pulse generation circuit. The pulse generation circuit receives a sampling signal characterizing a voltage between the two input terminals. Herein, the sampling signal is obtained through the resistor R3 and the resistor R4, and the sampling signal is compared with a first threshold and a second threshold within a power frequency period (such as a half-wave period) to control whether the detection path is turned on according to the result of the comparison. When the leakage phenomenon is detected between the two input terminals, the control circuit controls a load to be in a turning-off state. Specifically, an enable signal is output directly to control the load to be turned off, or a control signal is an output to control the drive circuit to be disconnected from the load.

In an embodiment, the pulse generation circuit includes the first comparator comp1, the second comparator comp2, and a pulse circuit. The first comparator includes the positive input terminal receiving the sampling signal $V_{CS}$, the negative input terminal receiving the first threshold VREF1, and the output terminal outputting the first comparison signal CP1. The second comparator includes the positive input terminal receiving the second threshold VREF2, the negative input terminal receiving the sampling signal $V_{CS}$, and the output terminal outputting the second comparison signal CP2. The pulse circuit receives the first comparison signal and the second comparison signal to output the first pulse signal and the second pulse signal. Specifically, when the first comparison signal jumps into effectiveness, the first pulse signal is generated. When the second comparison signal jumps into effectiveness, the second pulse signal is generated. Herein, the first pulse signal is generated at the rising edge of the first comparison signal, and the second pulse signal is generated at the rising edge of the second comparison signal. Moreover, the effective pulse width time of the first pulse signal and the effective pulse width time of the second pulse signal are set to be adjustable. Generally, the minimum effective pulse width and the maximum effective pulse width are set, and the pulse width can be set between the minimum effective pulse width and the maximum effective pulse width according to the actual needs.

Specifically, the detection path of the leakage detection circuit includes the switch M1 and the detection resistor Rs. The first pulse signal and the second pulse signal control the on-off state of the switch to control whether the detection path of the leakage detection circuit is turned on or off. Specifically, within the effective pulse width time of the first pulse signal or the effective pulse width time of the second pulse signal, the switch is turned on, such that the detection path is turned on. The detection resistor and the switch are connected in series between the two input terminals, and the detection resistor is sampled to obtain the current detection signal $V_{RS}$. The leakage detection circuit determines whether the leakage phenomenon exists between the two input terminals according to the comparison result of the current detection signal and the reference value VREF3. Herein, the current detection signal and the reference value VREF3 may be either voltage signals or current signals.

As an example, in the solution of the present invention, at the beginning of detection, the current detection signal $V_{RS}$ is compared with the reference value VREF3. When the current detection signal reaches the reference value, a valid comparison result is recorded, and cumulative counting is made. When the current detection signal does not reach the reference value, an invalid comparison result is recorded. A discrimination number M is set. If the counting times of the valid comparison result reach M, it is determined that no leakage phenomenon exists between the two input terminals. If the counting times of the valid comparison result do not reach M, it is determined that the leakage phenomenon exists between the two input terminals. If the invalid comparison result occurs during the detection time, the cumulative counting result is cleared to zero.

As an example, the value of the first threshold and the value of the second threshold are set to be unequal. The value of the first threshold and the value of the second threshold are set to be adjacent to the middle size of the half-wave signal, are unequal, and have the appropriate difference.

Figure 2A:
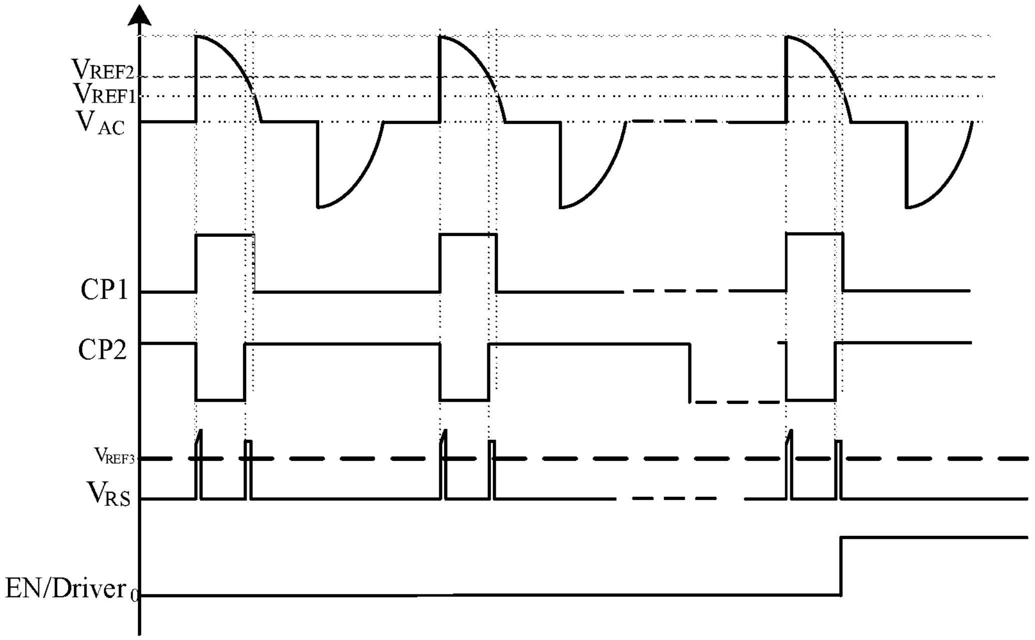
FIGS. 2A and 2B show a detection waveform according to the first embodiment of a front-edge phase-cutting angle of a phase-cutting dimmer of the present invention.
Figure 2B:
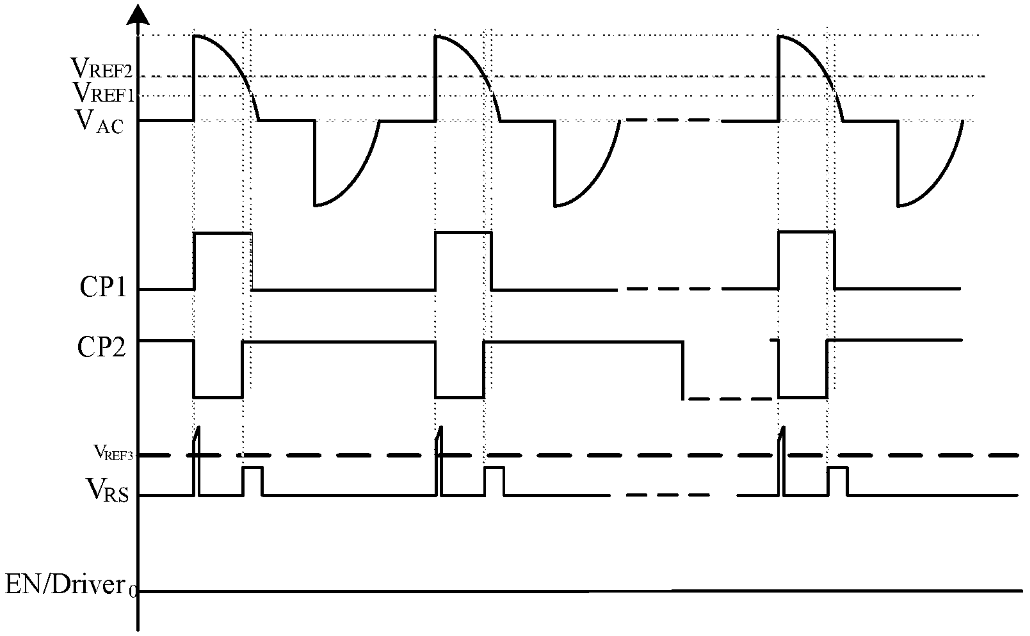

FIGS. 2A and 2B show a detection waveform according to the first embodiment of a front-edge phase-cutting angle of a phase-cutting dimmer of the present invention. For the phase-cutting dimmer in the front-edge phase-cutting angle, after the sampling signal is compared with the first threshold and the second threshold within a half-wave period, the first pulse signal and the second pulse signal are obtained according to the comparison result. Within the effective pulse width time of the first pulse signal and the effective pulse width time of the second pulse signal, the current detection signal is compared with the reference value. When no leakage exists between the two input terminals, human contact will not cause a large impedance, such that the detected current detection signal is large (as shown in FIG. 2A), and the current detection signal is higher than VREF3. When the leakage exists between the two input terminals, human contact will cause a large impedance, such that the detected current detection signal is small (as shown in FIG. 2B), and the current detection signal is lower than VREF3. However, as shown in FIG. 2B, due to the phase-cutting angle of the front-edge phase-cutting dimming, the current detection signal detected at the first time is large, and the current detection signal is higher than VREF3. Therefore, each time the current detection signal reaches the reference value, the valid comparison result is cumulatively counted. When the current detection signal does not reach the reference value, the invalid comparison result is recorded. The discrimination number M is set. If the counting times of the valid comparison result reach M, it is determined that no leakage phenomenon exists between the two input terminals. If the counting times of the valid comparison result do not reach M, it is determined that the leakage phenomenon exists between the two input terminals. In the detection process, if the invalid comparison result occurs, the counting result of the valid comparison result is cleared to zero. In this way, the leakage can be accurately determined without being affected by the high impedance caused by the phase-cutting angle.

Figure 4A:
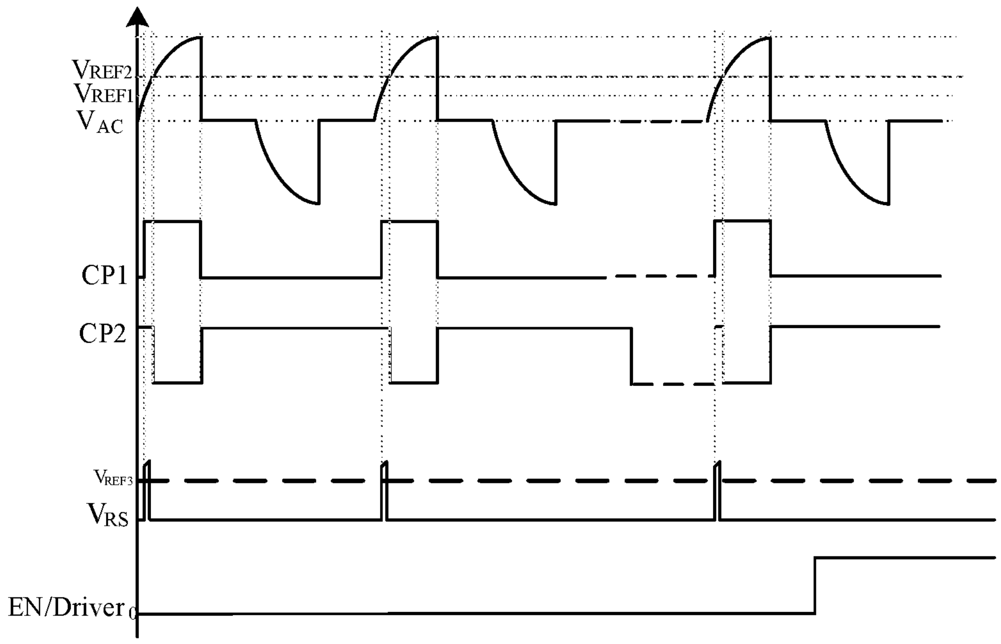
FIGS. 4A and 4B show a detection waveform according to the first embodiment of a rear-edge phase-cutting angle of the phase-cutting dimmer of the present invention.
Figure 4B:
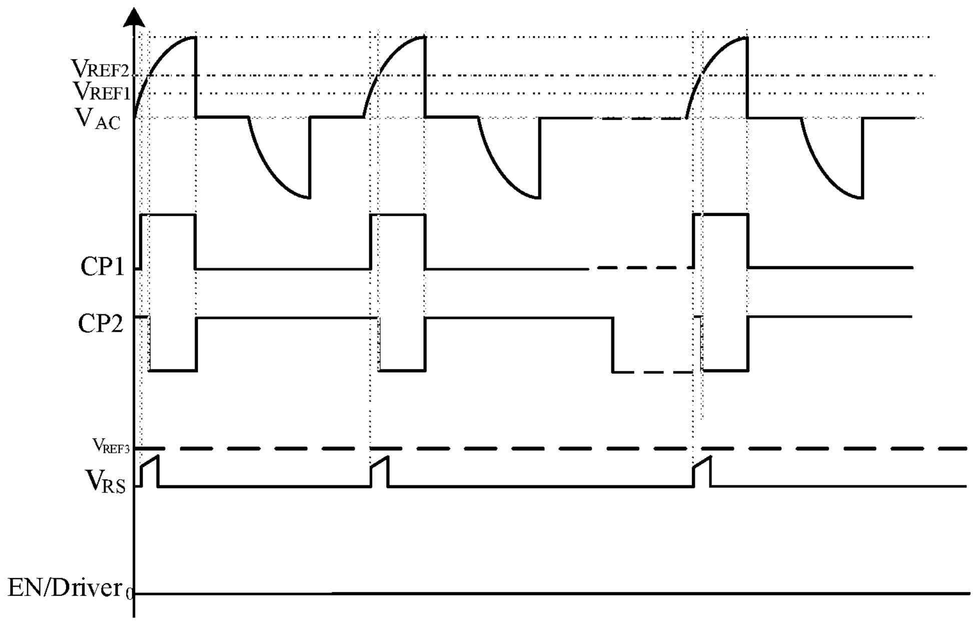

FIGS. 4A and 4B show a detection waveform according to the first embodiment of a rear-edge phase-cutting angle of the phase-cutting dimmer of the present invention. For the phase-cutting dimmer in the rear-edge phase-cutting angle, due to the rear-edge phase cutting, the current detection circuit can only detect the signal of the input terminals only once in a power frequency period. Therefore, compared with the discrimination number in the first embodiment of the front-edge phase-cutting angle of the phase-cutting dimmer of the present invention, the discrimination number M of the present embodiment can be halved, and in the detection process, if the cumulative counting times of the valid comparison result reach M, it is determined that no leakage phenomenon exists between the two input terminals, as shown in FIG. 4A. If the cumulative counting times of the valid comparison result do not reach M, it is determined that the leakage phenomenon exists between the two input terminals, as shown in FIG. 4B.

In an embodiment, the control circuit includes a driver and a logic circuit. The first pulse signal and the second pulse signal are transmitted to the driver, and the driver controls the switch to be turned on intermittently according to the first pulse signal and the second pulse signal. The detection result that is generated by the leakage detection circuit and characterizes whether a leakage exists between the two input terminals is transmitted to the logic circuit. The logic circuit outputs a first logic signal according to the detection result, and the first logic signal is converted into a drive signal through the driver to control the on-off state of the switch. Specifically, the detection result that is generated by the leakage detection circuit and characterizes whether an electric shock occurs is transmitted to the logic circuit, and the logic circuit outputs the first logic signal according to the detection result to control the switch MI to be turned on or off. Herein, the first logic signal generated by the logic circuit is converted by the driver into the drive signal to control the on-off state of the switch M1. When the detection result output by the detection circuit characterizes that a leakage exists, the logic circuit generates the first logic signal so that the switch M1 continues to be intermittently turned on to continue the detection. Alternatively, when the detection result output by the detection circuit characterizes that a leakage exists, the logic circuit generates the first logic signal to turn off the switch M1 to wait for the next period to restart detection. When the detection result output by the detection circuit characterizes that no leakage exists, the logic circuit generates the first logic signal to keep the switch M1 off to stop the detection of the leakage, which saves energy and improves efficiency.

It should be noted that the driver performs a drive conversion on the output signals of the pulse generation circuit and the logic circuit and drives the switch M1 through the converted signal, which can be realized by a level conversion circuit. The first logic signal generated by the logic circuit is the signal of different logic in different cases, which is adjusted according to the needs of the subsequent circuit. The voltage detection module may further include a switching circuit, and the switching circuit is configured to control the voltage detection module to not operate after the leakage detection is finished to improve the efficiency of the system.

In an embodiment, the lighting drive circuit further includes a gate drive or enable output circuit and a drive circuit. The gate drive or enable output circuit may be a circuit composed of a supply voltage and a switch tube, and the drive circuit may be a switching circuit including a main power switch tube and an energy storage capacitor, such as a Buck switching circuit, a Boost switching circuit, and other suitable drive circuits. The detection result that is generated by the detection circuit and characterizes the occurrence of electric shock is transmitted to the logic circuit, and the logic circuit outputs a second logic signal to the gate drive or enable output circuit according to the detection result to control whether the next-stage drive circuit operates normally or not. Herein, the second logic signal generated by the logic circuit is converted by the gate drive or enable output circuit into a drive signal or an enable signal to control the operation of the drive circuit. When the detection result output by the detection circuit characterizes that a leakage exists, the logic circuit generates the second logic signal to allow the gate drive or enable output circuit to output a non-enable signal to control the drive circuit to not operate or the drive circuit to not enable and to prevent the user from being subject to an electric shock. When the detection result output by the detection circuit characterizes that no leakage exists, the logic circuit generates the second logic signal to allow the gate drive or enable output circuit to output the enable signal (EN/Driver) to control the normal drive of the drive circuit and supply power to the load (such as an LED lamp). Herein, the control of the enable signal to the drive circuit may be to control the main power switch tube of the drive circuit to be in normal operation or not, or to control other circuit components, such as the comparator, in the drive circuit to be in the normal operation or not, or to control the output of the drive circuit, or to control a switching circuit to be turned off to allow the drive circuit to not work.

Figure 3A:
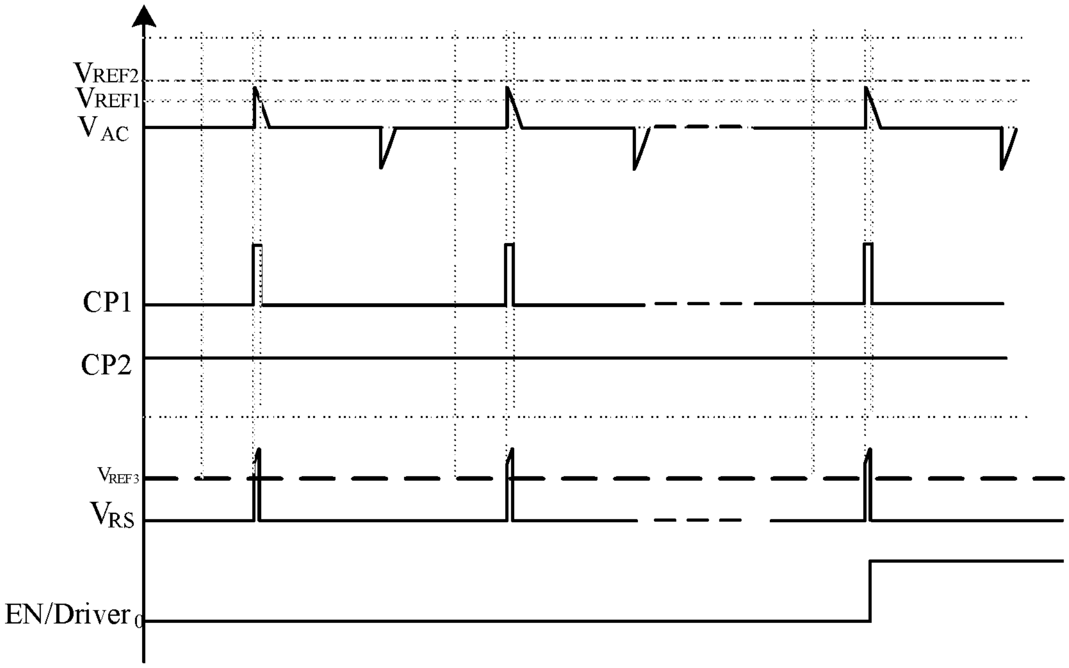
FIGS. 3A and 3B show a detection waveform according to the second embodiment of the front-edge phase-cutting angle of the phase-cutting dimmer of the present invention.
Figure 3B:
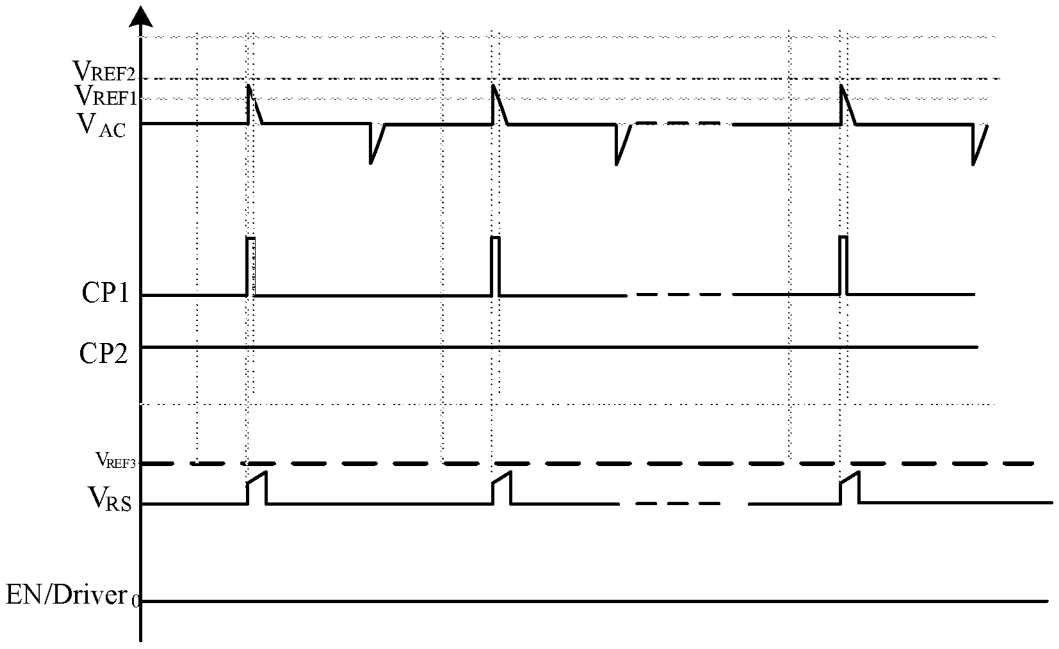

FIGS. 3A and 3B show a detection waveform according to the second embodiment of the front-edge phase-cutting angle of the phase-cutting dimmer of the present invention. For the phase-cutting dimmer in the front-edge phase-cutting angle in the case of a large phase-cutting angle, since two thresholds of different sizes are set in the present invention, the sampling signal can be compared with one of the thresholds in a power frequency period, and the current detection circuit can detect the signal of the input terminals once. Therefore, compared with the discrimination number in the first embodiment of the front-edge phase-cutting angle of the phase-cutting dimmer of the present invention, the discrimination number M of the present embodiment can be halved, and in the detection process, if the cumulative counting times of the valid comparison result reach M, it is determined that no leakage phenomenon exists between the two input terminals, as shown in FIG. 3A. If the cumulative counting times of the valid comparison result do not reach M, it is determined that the leakage phenomenon exists between the two input terminals, as shown in FIG. 3B. In the same way, for the rear-edge phase-cutting angle, it can be determined whether the leakage exists or not in the case of a large phase-cutting angle.

In the leakage protection circuit and the dimming drive circuit according to the embodiments of the present invention, in any type of phase-cutting angle of the phase-cutting dimmer, the user is prevented from the electric shock caused by touching one terminal of the lamp being connected and the other terminal of the lamp being exposed. The power circuit where the LED lamp load is located can be avoided from being turned on when there is an electric shock, such that there is no current generation and no safety risk problem. The present invention considers leakage detection in the dimming drive circuit of the front-edge phase-cutting dimming and rear-edge phase-cutting dimming and has a wide range of applications.

The above embodiments do not constitute a limitation on the scope of protection of the technical solutions. Any modifications, equivalent replacements, and improvements made within the concepts and principles of the above embodiments shall be included in the scope of protection of the technical solutions.

What is claimed is:

1. A leakage protection circuit comprising two input terminals for receiving an external signal, wherein the leakage protection circuit comprises:

a leakage detection circuit, wherein the leakage detection circuit is connected between the two input terminals and detects whether a leakage phenomenon exists between the two input terminals when a detection path of the leakage detection circuit is turned on; and a control circuit, wherein the control circuit receives a sampling signal characterizing a voltage between the two input terminals, the control circuit is configured to compare the sampling signal with a first threshold and a second threshold within a power frequency period, and the control circuit controls whether the detection path is turned on according to a comparison result;

wherein when the leakage phenomenon is detected between the two input terminals, the control circuit controls a load to be in a non-working state, wherein the control circuit comprises a pulse generation circuit, wherein the pulse generation circuit is configured to obtain a first comparison signal according to a comparison between the sampling signal and the first threshold and obtain a second comparison signal according to a comparison between the sampling signal and the second threshold; and a first pulse signal is obtained according to the first comparison signal, and a second pulse signal is obtained according to the second comparison signal; and the first pulse signal and the second pulse signal are configured to control whether the detection path is turned on or off.

2. The leakage protection circuit according to claim 1, wherein when the first comparison signal jumps to a high-level effective state, the first pulse signal is generated; and when the second comparison signal jumps to a high-level effective state, the second pulse signal is generated.

3. The leakage protection circuit according to claim 1, wherein the detection path is turned on within an effective pulse width time of the first pulse signal or an effective pulse width time of the second pulse signal.

4. The leakage protection circuit according to claim 1, wherein a value of the first threshold and a value of the second threshold are unequal.

5. The leakage protection circuit according to claim 1, wherein the detection path comprises a switch, wherein the first pulse signal and the second pulse signal control an on-off of the switch to control whether the detection path of the leakage detection circuit is turned on or off.

6. The leakage protection circuit according to claim 5, wherein the detection path further comprises a detection resistor, wherein the detection resistor and the switch are connected in series between the two input terminals, and the detection resistor is sampled to obtain a current detection signal; and the leakage detection circuit is configured to determine whether the leakage phenomenon exists between the two input terminals according to a comparison result between the current detection signal and a reference value.

7. The leakage protection circuit according to claim 6, wherein when a detection is started, the current detection signal is compared with the reference value; when the current detection signal reaches the reference value, a valid comparison result is recorded, and a cumulative counting is made; when the current detection signal does not reach the reference value, an invalid comparison result is recorded;

a discrimination number M is set, wherein if counting times of the valid comparison result reach M, no leakage phenomenon exists between the two input terminals; if the counting times of the valid comparison result do not reach M, the leakage phenomenon exists between the two input terminals; and during the detection, if the invalid comparison result occurs, a cumulative counting result is cleared to zero.

8. The leakage protection circuit according to claim 1, wherein the pulse generation circuit comprises a first comparator, a second comparator, and a pulse circuit, wherein the first comparator comprises a positive input terminal receiving the sampling signal, a negative input terminal receiving the first threshold, and an output terminal outputting the first comparison signal;

the second comparator comprises a positive input terminal receiving the second threshold, a negative input terminal receiving the sampling signal, and an output terminal outputting the second comparison signal; and the pulse circuit receives the first comparison signal and the second comparison signal to output the first pulse signal and the second pulse signal.

9. The leakage protection circuit according to claim 1, wherein the control circuit comprises a driver and a logic circuit, wherein the first pulse signal and the second pulse signal are transmitted to the driver, and the driver controls a switch to be turned on intermittently according to the first pulse signal and the second pulse signal; and a detection result is transmitted to the logic circuit, wherein the detection result is generated by the leakage detection circuit and characterizes whether a leakage exists between the two input terminals; the logic circuit outputs a first logic signal according to the detection result, and the first logic signal is converted into a drive signal through the driver to control an on-off state of the switch.

10. The leakage protection circuit according to claim 9, wherein when the detection result characterizes that the leakage exists, wherein the detection result is output by the leakage detection circuit, the logic circuit generates the first logic signal to allow the switch to continue to be intermittently turned on to continue a detection; or when the detection result characterizes that the leakage exists, the logic circuit generates the first logic signal to allow the switch to be turned off to wait for a next period to restart the detection; and when the detection result characterizes that no leakage exists, the first logic signal allows the switch to be turned off to stop the detection of the leakage, wherein the first logic signal is generated by the logic circuit.

11. A dimming drive circuit configured for driving a lighting load, wherein the dimming drive circuit comprises a phase-cutting dimmer, a rectifier circuit, the leakage protection circuit according to claim 1, and a drive circuit;

an external alternating current (AC) input signal is processed by the phase-cutting dimmer and transmitted to the rectifier circuit, and the rectifier circuit outputs a rectified signal;

the two input terminals of the leakage protection circuit receive an output signal of the phase-cutting dimmer or the rectified signal; and the drive circuit drives the lighting load according to the rectified signal and a detection result of the leakage protection circuit.

12. The dimming drive circuit according to claim 11, wherein when the detection result of the leakage protection circuit characterizes that a leakage exists, the drive circuit is controlled to not work or to not be enabled; and when the detection result of the leakage protection circuit characterizes that no leakage exists, the drive circuit is controlled to drive normally to supply power to the lighting load.

13. The dimming drive circuit according to claim 11, wherein in the leakage protection circuit, when the first comparison signal jumps to a high-level effective state, the first pulse signal is generated; and when the second comparison signal jumps to a high-level effective state, the second pulse signal is generated.

14. The dimming drive circuit according to claim 11, wherein the leakage protection circuit, the detection path is turned on within an effective pulse width time of the first pulse signal or an effective pulse width time of the second pulse signal.

15. The dimming drive circuit according to claim 11, wherein in the leakage protection circuit, a value of the first threshold and a value of the second threshold are unequal.

16. The dimming drive circuit according to claim 11, wherein in the leakage protection circuit, the detection path comprises a switch, wherein the first pulse signal and the second pulse signal control an on-off of the switch to control whether the detection path of the leakage detection circuit is turned on or off.

17. The dimming drive circuit according to claim 16, wherein in the leakage protection circuit, the detection path further comprises a detection resistor, wherein the detection resistor and the switch are connected in series between the two input terminals, and the detection resistor is sampled to obtain a current detection signal; and the leakage detection circuit is configured to determine whether the leakage phenomenon exists between the two input terminals according to a comparison result between the current detection signal and a reference value.

18. The dimming drive circuit according to claim 17, wherein in the leakage protection circuit, when a detection is started, the current detection signal is compared with the reference value; when the current detection signal reaches the reference value, a valid comparison result is recorded, and a cumulative counting is made; when the current detection signal does not reach the reference value, an invalid comparison result is recorded;

a discrimination number M is set, wherein if counting times of the valid comparison result reach M, no leakage phenomenon exists between the two input terminals; if the counting times of the valid comparison result do not reach M, the leakage phenomenon exists between the two input terminals; and during the detection, if the invalid comparison result occurs, a cumulative counting result s cleared to zero.

* * * * *